United States Patent
Mohammed

(10) Patent No.: US 11,027,923 B1
(45) Date of Patent: Jun. 8, 2021

(54) CHUTE ACCUMULATION SYSTEM

(71) Applicant: Amazon Technologies, Inc., Seattle, WA (US)

(72) Inventor: Raashid Mohammed, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/577,977

(22) Filed: Sep. 20, 2019

(51) Int. Cl.
| | | |
|---|---|---|
| *B65G 11/20* | (2006.01) | |
| *B65G 15/08* | (2006.01) | |
| *B65G 47/44* | (2006.01) | |
| *B65G 47/04* | (2006.01) | |

(52) U.S. Cl.
CPC ............ *B65G 11/203* (2013.01); *B65G 15/08* (2013.01); *B65G 47/04* (2013.01); *B65G 47/44* (2013.01); *B65G 2201/02* (2013.01)

(58) Field of Classification Search
CPC .... B65G 11/203; B65G 11/023; B65G 15/08; B65G 47/04; B65G 47/44
USPC ............................................... 193/2 R, 32, 4
See application file for complete search history.

(56) References Cited

U.S. PATENT DOCUMENTS

| | | | | |
|---|---|---|---|---|
| 1,885,582 | A * | 11/1932 | Brandt .................... | B65G 47/71 193/31 R |
| 2,842,243 | A * | 7/1958 | Neidhardt ............ | B65G 47/295 193/40 |
| 3,612,364 | A * | 10/1971 | Coucher .............. | B65D 90/623 222/427 |
| 3,905,467 | A * | 9/1975 | Babik ..................... | B65G 47/28 193/2 R |
| 8,546,704 | B1 * | 10/2013 | Minardi .................. | B65B 5/101 177/25.18 |
| 10,336,542 | B2 * | 7/2019 | Garrett .................... | B65G 47/52 |
| 2013/0256090 | A1 * | 10/2013 | Heitplatz ............. | B65G 11/203 193/2 R |
| 2017/0197233 | A1 * | 7/2017 | Bombaugh ............... | B07C 5/36 |
| 2017/0334648 | A1 * | 11/2017 | Hartmann ............ | B65G 11/023 |

* cited by examiner

*Primary Examiner* — James R Bidwell
(74) *Attorney, Agent, or Firm* — Patterson + Sheridan, LLP

(57) ABSTRACT

Embodiments herein describe a chute for temporarily buffering packages when, for example, a container disposed at the end of the chute has been removed. The chute includes a flap that activates to hold packages in an accumulation area when the container is removed. In one embodiment, the flap is disposed at an end of the chute at a decline so that during normal operation packages slide off the flap into the container. An actuator can rotate the flap from a decline position into a vertical position such that the flap serves as a stop to prevent packages from sliding off the chute when containers are being swapped out. Once a new container is disposed at the end of the chute, the actuator can rotate the flap back to the decline position so that any accumulated packages are then ejected into the container.

18 Claims, 7 Drawing Sheets

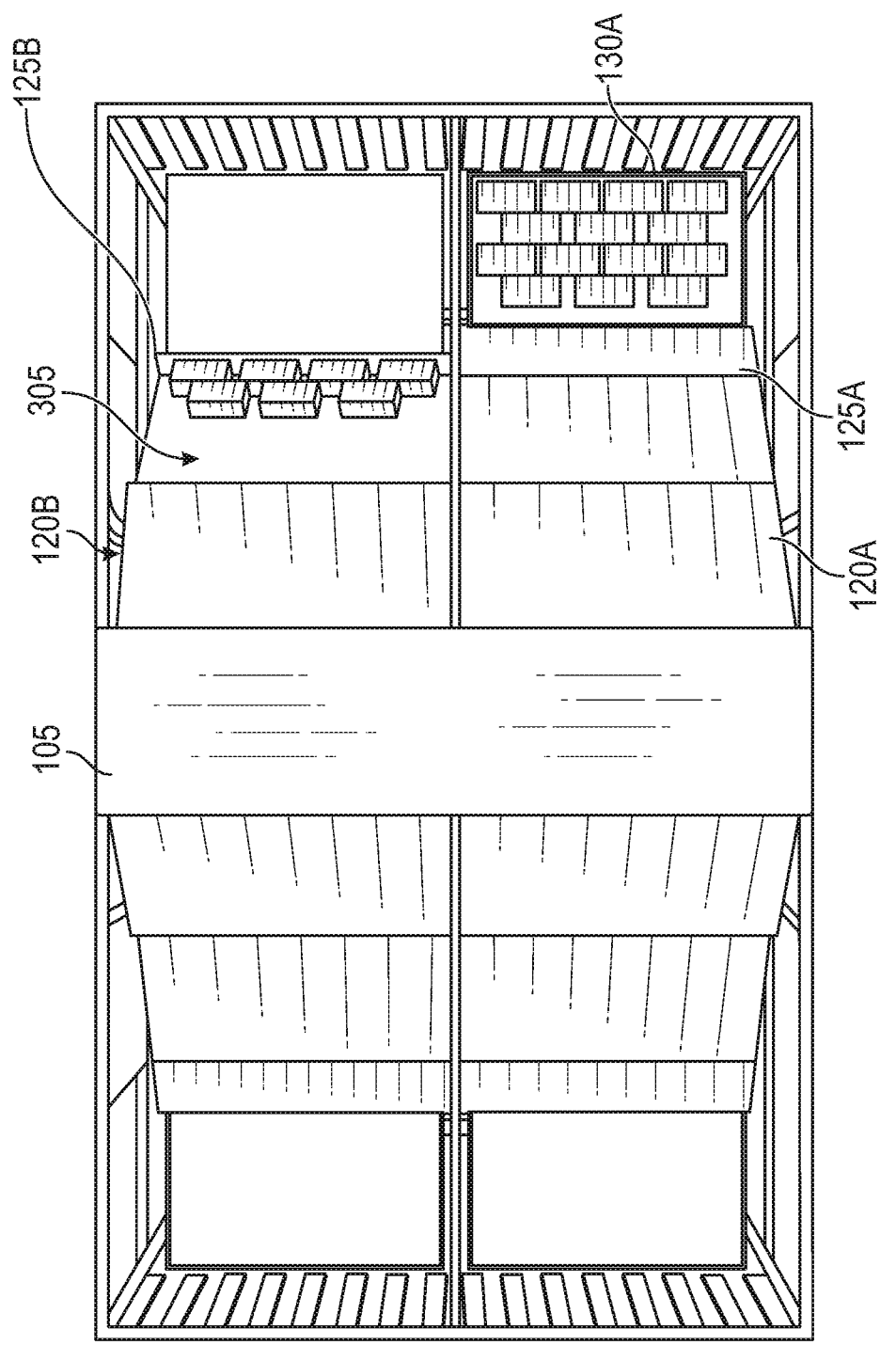

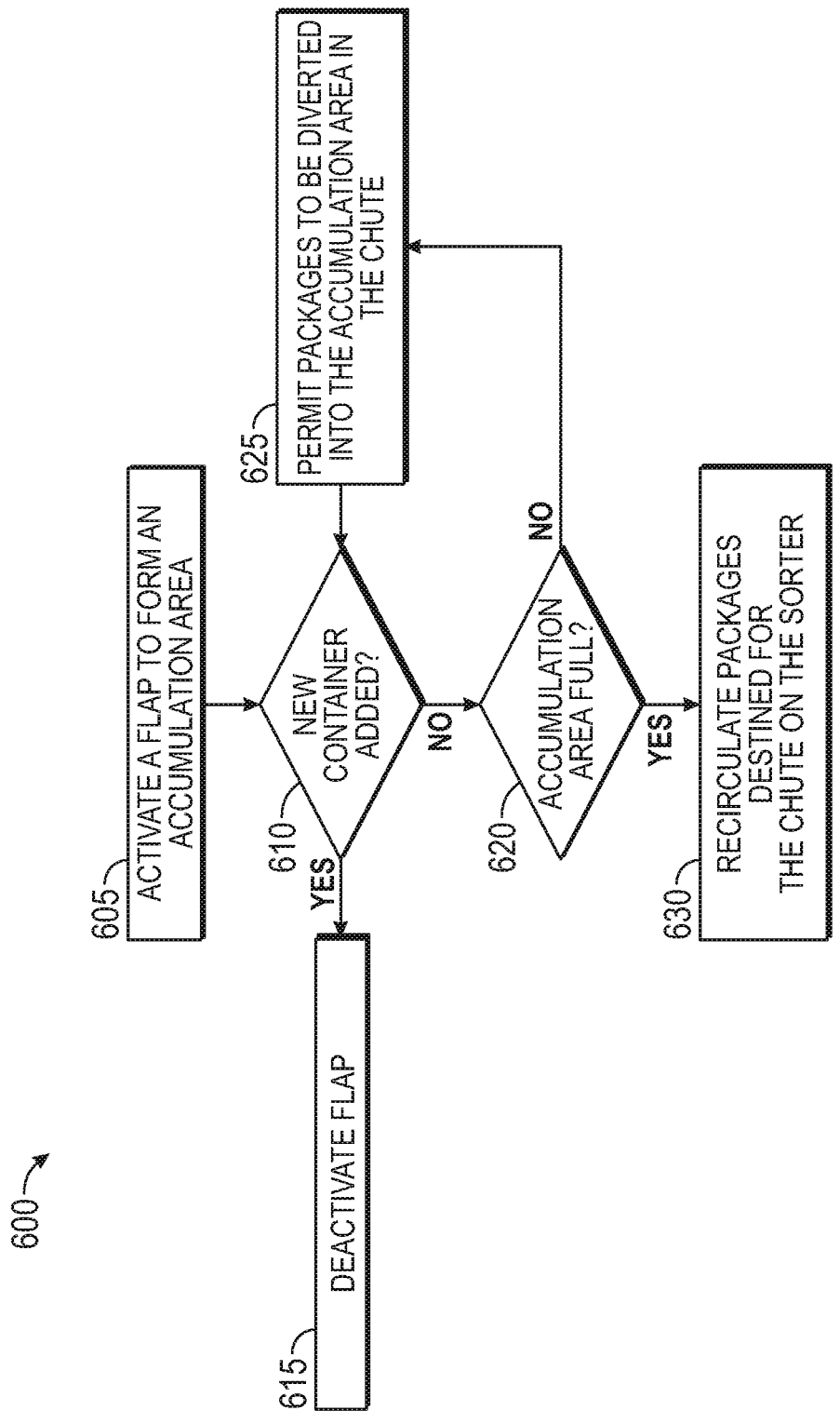

CHUTE ACCUMULATION SYSTEM

BACKGROUND

The present invention relates to chutes for sorting packages into containers, and more specifically, to chutes with accumulator flaps to temporary buffer packages while containers are being replaced.

A sorter can include a conveyor belt and diverters for sorting packages to different destinations. For example, as packages travel down the conveyor belt, a diverter can activate which pushes a package off the belt and into a chute disposed at the side of the conveyor belt. The chute then directs the package to a container (e.g., a Gaylord box) corresponding to a destination of the package. For example, there may be multiple chutes and corresponding containers arranged along the length of the conveyor belt. A warehouse management system (WMS) can control the diverters (which are also arranged along the length of the belt) so that packages are moved from off the conveyor belt and into a chute that corresponds to the destination of the package.

Often, the containers at the ends of the chutes need to be replaced, e.g., when the container is full. Diverting packages into the chute when a container is being replaced would cause the packages to fall on the floor rather than in the desired container. Instead, the WMS can recirculate the packages on the sorter until a new container has been placed at the chute. However, recirculating the packages can increase the package density on the conveyor belt which can make sorting less accurate and slower.

BRIEF DESCRIPTION OF DRAWINGS

FIGS. 4A and 4B illustrate chutes with activated and deactivated flaps, according to one embodiment described herein.

FIG. 6 is a flowchart for monitoring a chute when temporarily buffering packages, according to one embodiment described herein.

DETAILED DESCRIPTION

Embodiments herein describe a chute for temporarily buffering packages when, for example, a container disposed at the end of the chute is full to capacity or has been removed. The chute includes a flap that activates to hold packages in an accumulation area when the container is removed. In one embodiment, the flap is disposed at an end of the chute at a decline so that during normal operation packages slide off the flap into the container. The flap can be rotatably connected to the chute (e.g., via a hinge) so that when the container is removed, an actuator can rotate the flap from a decline position into a vertical position so that the flap serves as a stop to prevent packages from sliding off the chute. Doing so enables the chute to form an accumulation area for accumulating packages while, e.g., the container is being replaced. Once a new container is disposed at the end of the chute, the actuator can rotate the flap back to the decline position so that any accumulated packages are ejected into the container (either forcibly using, e.g., powered rollers or by gravity). Thus, rather than having to recirculate the packages on a sorter, the sorter can advantageously continue to divert packages into the chute when the container for the chute has been removed. This can reduce congestion on the conveyor belt and improve the overall sorting time for the sorter.

Figure 1:
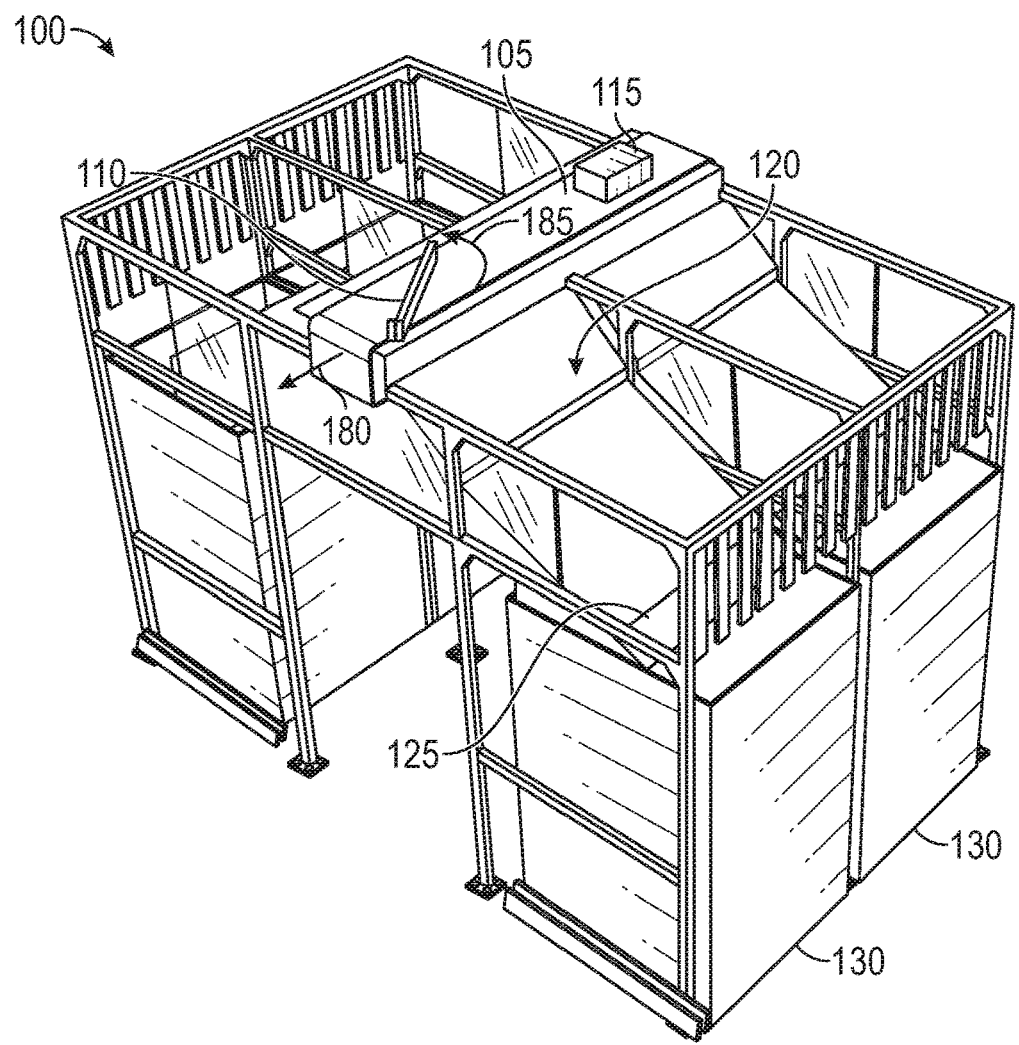
FIG. 1 illustrates a sortation system with a chute with an accumulator flap that can serve as a temporary buffer for packages, according to one embodiment described herein.
Figure 1:
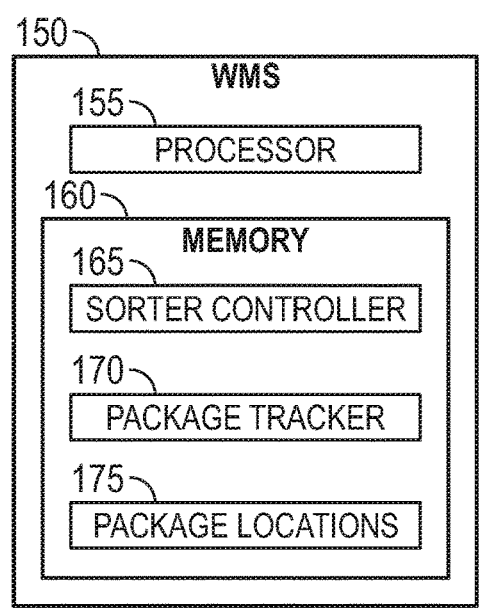

FIG. 1 illustrates a sortation system 100 with a chute 120 with an accumulator flap 125 that can serve as a temporary buffer for packages, according to one embodiment described herein. The sortation system 100 includes a sorter, which is formed by the combination of a conveyor belt 105 and one or more diverters 110, a plurality of chutes 120 disposed along the sides of the conveyor belt 105, containers 130 disposed at the ends of the chutes 120 to catch packages sliding off the chutes 120, and a WMS 150.

The conveyor belt 105 can be any movement system that moves packages 115 along a defined path. While a conveyor belt 105 is shown, the movement system could be beltless such as powered rollers or a smooth surface or unpowered rollers arranged at an incline so that gravity moves the packages in the direction shown by the arrow 180 and past the chutes 120. To divert or move the package 115 off the conveyor belt 105 and into one of the chutes 120, the sorter includes at least one diverter 110. In FIG. 1, the diverter 110 includes a vertical surface (e.g., a padded) that is pivotally connected to a side of the sorter. While the conveyor belt 105 moves in the direction of the arrow 180, location of the diverter 110 remains fixed. The WMS 150 includes a sorter controller 165 (e.g., a software application) which activates the diverter 110 to move the package 115 from off the conveyor belt 105 and into one of the chutes 120. For example, the chute 120 (and the corresponding container 130) may be assigned to the same destination as the package 115—e.g., a particular zip code, another warehouse, a third-party shipping service, and the like. In one embodiment, the four chutes and containers 130 in FIG. 1 are each assigned a different destination. For simplicity, FIG. 1 illustrates only one diverter 110 which can be used to divert or move packages into the chute 120 (e.g., the lower left chute). The sorter may include other diverters for moving packages off the conveyor belt 105 and into the other three chutes illustrated in FIG. 1.

In FIG. 1, it is assumed the sorter controller 165 has determined that the package 115 should be diverted off the conveyor belt 105 and into the chute 120. In response, the sorter controller 165 pivots the diverter 110 at its pivot point as shown by the arrow 185. Eventually the conveyor belt 105 moves the package 115 until it contacts the vertical surface of the diverter 110 which guides the package 115 into the chute 120. While a pivoting type diverter 110 is shown, other types of diverters could be used, such as a piston type diverter where a piston extends out from one side of the sorter to push the package into a chute disposed on the opposite side of the converter, or a diverter that uses air bursts to knock a package off the conveyor belt 105 and into the desired chute 120.

Once on the chute 120, the package 115 slides down the chute 120 until falling into the container 130. That is, the chute 120 includes one or more surfaces that are arranged at a decline so that gravity pulls the package 115 down the chute 120 and into the container 130. While the chute may be have a smooth surface (e.g., one or more smooth metallic sheets) to minimize friction between the surface and the package 115, in another embodiment, the chute 120 may include rollers (powered or unpowered) which move the package down the chute 120 and into the container 130. Further, as discussed in more detail later in FIG. 5, the chute 120 can include a step (e.g., a vertical drop) which may aid the chute 120 when temporarily buffering packages.

The accumulator flap 125 is disposed at the end of the chute 120 closest to the container 130. In this example, the accumulator flap 125 is rotatably connected to the chute 120 via a hinge so that the flap 125 can be rotated from the declined position (e.g., a first position) shown in FIG. 1 to a vertical (or near vertical) position (e.g., a second position). For example, when the container 130 disposed at the end of the chute 120 is removed, the sorter controller 165 rotates the flap up to the vertical position. Thus, any packages diverted from the conveyor belt 105 into the chute 120 slide down the chute 120 until hitting the flap 125. That is, the flap 125 prevents the package from being ejected off of the chute 120. In this manner, changing the position of the flap 125 to a more vertical position permits the chute 120 to accumulate packages until a human associate, robot, or machine places a new container at the end of the chute 120.

Without the rotatable flap 125 and the control algorithm performed by the sorter controller 165, any packages with a destination corresponding to the chute 120 may have to be recirculated on the sorter. For example, if the conveyor belt 105 forms a circle, the packages stay on the conveyor belt without being diverted as they pass the chute 120. If the conveyor belt 105 is linear, the end of the conveyor belt may include a "catch-all" chute which collects packages that were not sorted (e.g., because a container was being replaced). An associate may then have to collect the un-sorted packages and put them back on the front of the conveyor belt 105 at a later time. Thus, recirculating the packages can increase the density of packages on the sorter (which may make it more difficult for the diverters 110 to accurately divert individual packages into a chute) as well as slow down the sort time (since packages need to recirculate on the conveyor belt 105). In contrast, by buffering packages, the packages can be temporarily stored in the chute 120 itself rather than recirculating on the sorter. The buffered packages can then be ejected once a new container 130 is disposed at the end of the chute 120.

While FIG. 1 and the figures that follow illustrate a flap 125 that rotates from a declined position to a more vertical position to buffer packages, the embodiments herein are not limited to such. In another embodiment, a blocking surface may be raised or lowered to block the end of the chute 120 to prevent packages from being ejected off the chute 120. For example, during normal operation, a vertical blocking surface may be recessed below the end of the chute 120 so that packages can slide off the chute 120 and into the container 130. However, when the container 130 is removed, the sorter controller 165 can raise the blocking surface from its recessed position such that the blocking surface now blocks the end of the chute 120, much like rotating the flap 125 into a more vertical position blocks packages. Or a vertically arranged blocking surface can be raised above the chute 120 during normal operation so that packages can freely pass under the blocking surface and fall into the container 130. When the container 130 is removed, the sorter controller 165 can lower the blocking surface so that it contacts the declined surface at the end of the chute 120, thereby blocking packages from being ejected off the chute 120. In yet another example, a blocking surface may be pivotally attached at the end of the chute so the blocking surface can pivot from a closed position where it blocks packages at the end of the chute or an open position that permits packages to slide into the container, like a gate.

While FIG. 1 illustrates disposing the flap 125 at the end of the chute 120, this is not a requirement, the flap 125 could be disposed further up the chute 120 and still be rotated up to block packages from being ejected off the chute 120. However, placing the flap 125 at the end of the chute 120 may provide more space for buffering the packages.

The WMS 150 includes a processor 155 and memory 160. The processor 155 can represent one or more processing elements that each can include any number of processing cores. The memory 160 can include volatile memory, non-volatile memory, and combinations thereof. The memory 160 includes the sorter controller 165 and a package tracker 170. As discussed above, the sorter controller 165 can control the various physical components in the system 100 such as the sorter (e.g., the conveyor belt 105 and the diverter 110) and the accumulator flap 125 in the chute 120. Although not shown, the sorter controller 165 may include computer vision systems or barcode scanners for reading address information on the packages 115 to determine their proper destination. The sorter controller 165 can track the location of the packages on the conveyor belt 105 and activate one of the diverters 110 to ensure the packages are moved into a chute corresponding to their destination.

The package tracker 170 tracks the locations 175 of the packages. That is, the package tracker 170 can determine that the package 115 is currently on the conveyor belt 105 (e.g., when the package 115 is scanned by a barcode reader). When the sorter controller 165 diverts the package into the chute 120, the package tracker 170 updates the location of the package 115 to the container 130 disposed underneath the chute 120. In this manner, the package tracker 170 can update the location 175 of the package as it moves through the warehouse containing the sorter. In one embodiment, when the flap 125 is raised so that the chute 120 servers as a temporary buffer, the locations 175 of any packages diverted into the chute 120 are updated to reflect that the packages are currently stored on the chute itself (rather than on the conveyor belt 105 or in a container 130). Thus, the package tracker 170 can track packages that are currently being buffered on the chute 120.

Figure 2:
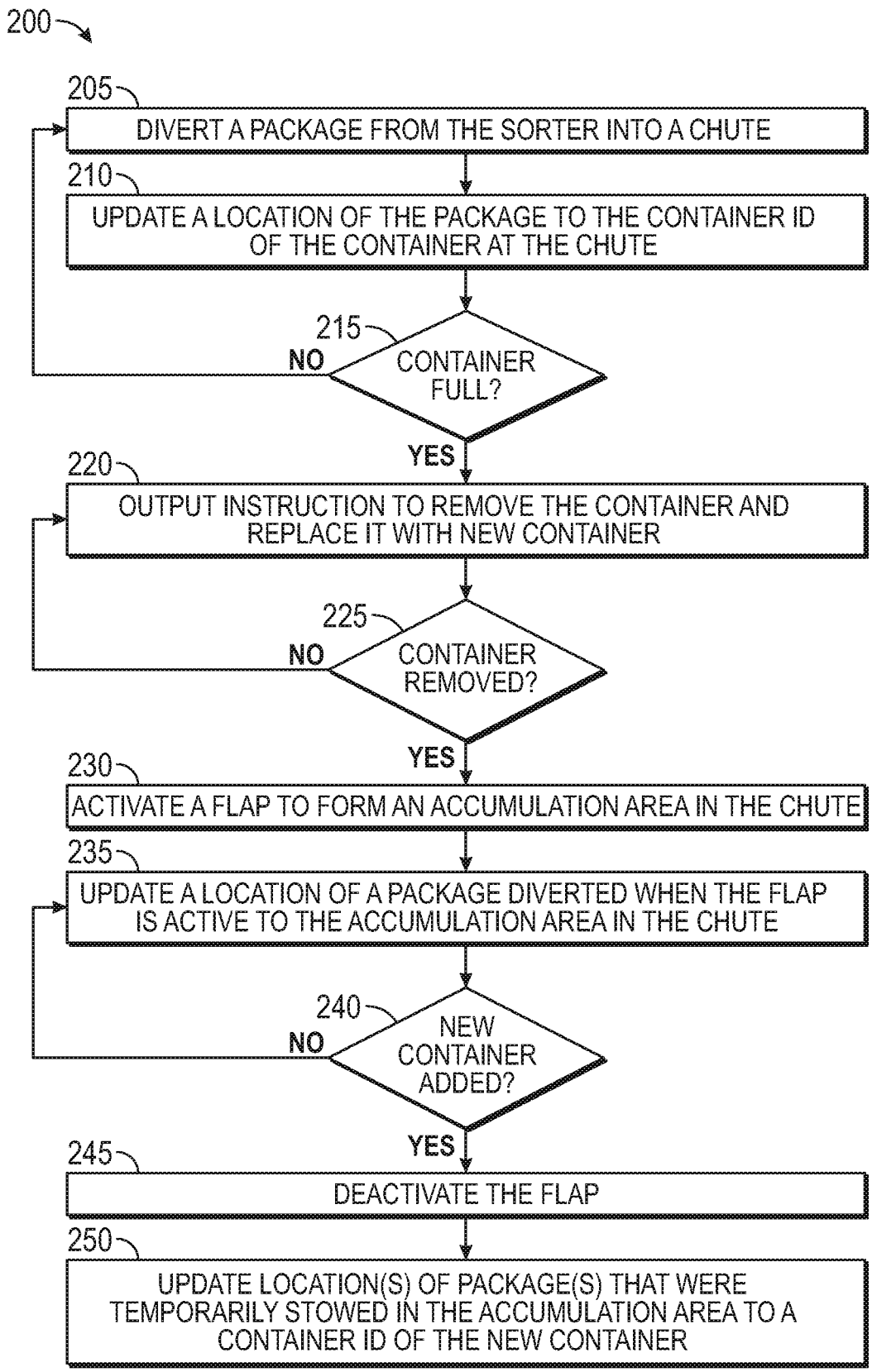
FIG. 2 is flowchart for establishing an accumulation area in a chute using a flap, according to one embodiment described herein.

FIG. 2 is flowchart of a method 200 for establishing an accumulation area in a chute using a flap, according to one embodiment described herein. For clarity, some of the blocks in the method 200 are described in parallel with FIG. 3 which illustrates chutes with flaps activated to form accumulation areas for buffering packages, according to one embodiment described herein.

At block 205, the sorter controller diverts a package from the sorter into a chute. In one embodiment, the sorter controller actuates diverters for selectively diverting or moving packages from a movement system (e.g., a conveyor belt) into a chute. The chute may corresponding to a final or intermediate destination of the package. For example, a plurality of chutes may be disposed along a side of a conveyor belt where each chute corresponds to a different destination (e.g., zip code, a shipping facility, shipping dock or port, delivery service, etc.). Containers (e.g., Gaylord boxes) are disposed at the end of the chutes to catch the packages moved into the corresponding chutes.

At block 210, the package tracker updates a location of the package to a container ID of the container at the chute. For example, the location of the package may have previously been the sorter (or the conveyor belt), but once the package is diverted into a chute, the location of the package is updated to be the container ID of the container. Thus, as the container is moved in the warehouse, the new location of the container can also be assigned as the location of the package.

In one embodiment, the chute includes a detector for confirming that a package was removed from the conveyor belt and into the chute. For example, the chute may include a photo eye detector at the end of the chute coupled to the sorter. If a beam generated by the photo eye detector is interrupted by the package as it is diverted into the chute, the package tracker 170 knows the package has made it successfully onto the chute and into the corresponding container, and thus, can update the location of the package as being stored in the container. However, if the beam of the photo eye is not interrupted, the sorter controller 165 can report that the package was not successfully diverted off the sorter into the chute (e.g., the package may have fallen onto the floor). In response, the package tracker may update the location of the package as being unknown. This may trigger an associate to investigate the area to determine whether the package is on the floor, or to check whether the package did make it into the container without being detected by the photo eye detector.

At block 215, the sorter controller determines whether the container is full. For example, a detector (e.g., a light curtain or photo eye detector) is disposed at a top of the container. If the detector detects a package is at the top of the container (e.g., a package remains at the top of the container rather than briefly being detected as the package falls from the chute into the container), the method 200 proceeds to block 220. Otherwise, if the container is not full, the method 200 returns to block 205 where additional packages can be diverted into the container. While a detector can be used to determine when a container is full, in another embodiment, an associate may monitor the containers to make a visible determination that a container is full and should be replaced.

At block 220, the sorter controller outputs instructions to remove the container and replace it with a new container. In one embodiment, the sorter controller may activate a light next to the container which indicates to an associate that she should remove the full container and replace it with a new one. In another embodiment, the container may be moved using a robot. For example, the container may be mounted on the top of a robotic mover that can move the container once the sorter controller indicates it is full. Another robotic mover (or the same robot) can move a new container in place under the chute.

At block 225, the sorter controller determines when the container is removed. For example, the sorter controller may wait until an associate hits a button near the container that indicates the associate is about to remove the container from underneath the chute. This informs the sorter controller that any packages diverted into the chute may not land in the container. In another embodiment, the sortation system may include a presence detector that informs the sorter controller when the container has been removed or is in the process of being removed. For example, as an associate begins to slide a container away from the chute, this motion may be detected by the presence detector and reported to the sorter controller.

Once the sorter controller determines the container has been removed (or is about to be removed), the method 200 proceeds to block 230, where the sorter controller activates a flap to form an accumulation area in the chute. There are several different ways the sorter controller can activate the flap. For example, the flap can be rotated from a declined position to a more vertical position to block or stop packages that are diverted onto the chute. In other examples, the method can include activating a blocking surface by raising or lowering a vertical blocking surface to prevent packages from sliding off the chute. Regardless of the activation action, the flap (or more generally, the blocking surface) establishes an accumulation area on the chute that can buffer diverted packages until a new container is placed underneath the chute.

In one embodiment, activating the blocking surface uses less force than the amount of force that the blocking surface can support when in the blocking position. For example, the chute may apply a small force (e.g., less than fifty or forty pounds of force) to rotate a flap to a vertical position. Once in the vertical position, the flap can support a much larger force. For example, the flap can support a force of over one hundred pounds being applied by packages in the accumulation area. Using a smaller force to activate the blocking surface may help to meet safety standards in a warehouse, while being able to support a larger force when the block surface is activated permits the blocking surface to hold larger numbers of heavier packages.

Figure 3:
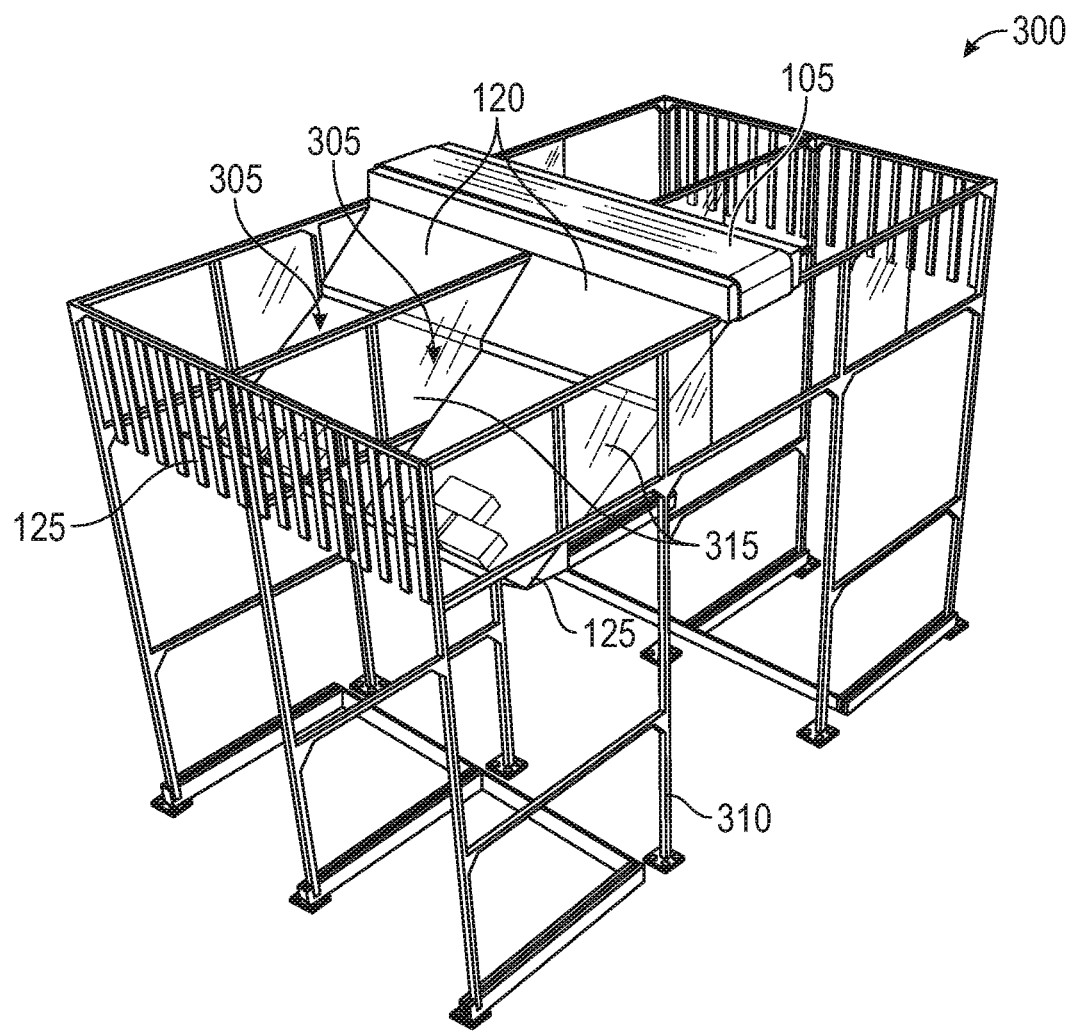
FIG. 3 illustrates chutes with flaps activated to form accumulation areas for buffering packages, according to one embodiment described herein.

FIG. 3 illustrates activating flaps 125 to form accumulation areas 305 on the chutes 120. In FIG. 3, the containers have been removed because, e.g., the containers are full or because the chutes 120 are being reassigned to different destinations. Using the method 200, the sorter controller activates the flaps 125 so they rotate to a vertical (or more vertical) position to block packages sliding down the chutes 120 to store the packages in respective accumulation areas 305.

The accumulation areas 305 can store (or buffer) multiple packages while waiting for a new container to be positioned underneath the chutes 120. In addition to raising the flaps 125, the chutes 120 also includes sides 315 which form opposing sides of the accumulation areas 305 (e.g., left and right sides). That is, the sides 315, the flap 125, and the bottom surface of the chutes 120 (e.g., the sliding surface of the chute 120) defines surfaces that form the accumulation area 305. These surfaces hold the packages until a container has been placed under the chute 120.

The chutes 120 are supported by a frame 310 which suspends the chutes (and the conveyor belt 105) above the containers. For example, the chutes 120 may be suspended above the floor of the warehouse using the frame 310 to provide sufficient space to move containers underneath the ends of the chutes 120 to catch the packages.

Return to the method 200, after activating the flaps at block 230, at block 235 the package tracker updates a location of a package stored in the accumulation area when the flap is activated. That is, rather than recirculating packages when a container has been removed, the sorter controller can continue to divert packages into the chute as done during normal operation when a container is underneath the chute. The packages are stored in the accumulation area formed by the raised flap and the sides of the chute. The package tracker can assign a temporary (or virtual) ID to the accumulation area which can then be assigned as the location of the diverted packages. That is, much like how packages placed in a container are given a location of the container using the container ID, the package tracker can assign the location of the packages to the ID of the accumulation area in the chute. When a flap is activated, the package tracker can use the temporary ID of the accumulation area as the location of the packages. However, when the flap is deactivated, the package tracker does not use the temporary ID of the accumulation area for the diverted packages, but rather the container ID of the container disposed underneath the chute.

Assigning the location of the packages to the temporary ID of the accumulation area enables the package tracker to assign a location to the packages when they are being temporarily buffered on the chute. This may enable the WMS to maintain a more accurate location of the packages than if these packages remained on the conveyor belt or were recirculated.

At block 240, the sorter controller determines whether a new container was added to the sortation system. For example, the sorter controller may determine whether a new container is disposed underneath the chute. In one embodiment, the associate who places the new container underneath the chute can press a button that informs the sorting controller that the new container is in place and is ready to receive packages. In another embodiment, the same presence detector used to detect when a container is removed can also be used to determine when a new container has been added.

If a new container has not been added, the method 200 returns to block 235 where additional packages can be diverted into the accumulation area. When a new container is added, the method 200 proceeds to block 245 where the sorting controller deactivates the flap. Referring to FIG. 3, deactivating the flap 125 includes rotating the flap to a declined position from a more vertical position. In one embodiment, the flap is aligned with the other declined (fixed) surfaces of the chute such that the flap and these surface form a continuous surface for ejecting packages from the chute into the package, however this is not a requirement. For example, the flap may have a larger decline that the other portions of the chute which may make it easier for packages to slide off the chute into the container.

In other embodiments, the method 200 includes deactivating a blocking surface (of which, a flap is one example) by raising or lowering the blocking surface to permit packages to slide off of the chute and into the new container. Stated generally, the method 200 includes activating any type of suitable blocking surface (e.g., by rotating, lifting, pivoting, etc.) to block packages from exiting the chute, while deactivating the blocking surface can include moving the blocking surface to permit packages to exit the chute into the container. In one embodiment, the action performed when deactivating the blocking surface may be a reverse of the action performed when activating the blocking surface. For example, activating the blocking surface and deactivating the blocking surface may include moving the blocking surface between two different predefined positions.

At block 250, the package tracker updates location(s) of package(s) that were temporarily stowed in the accumulation area to a container ID of the new container. That is, deactivating the flap permits the packages stowed in the accumulation area to slide off the chute and into the new container. In one embodiment, moving the flap is sufficient to eject the packages from the accumulation area in the chute to the container. That is, when the flap is deactivated, the force of gravity causes the packages to slide off the chute and into the container. In another embodiment, the chute may include one or more actuators (e.g., power rollers or a conveyor belt) which activates to move the packages off the chute and into the container. In any case, once the packages are ejected from the chute into the container, the package tracker updates the location of the packages to correspond to the container ID of the new container. In this manner, the packages can be tracked as the container moves around the warehouse.

Figure 4B:
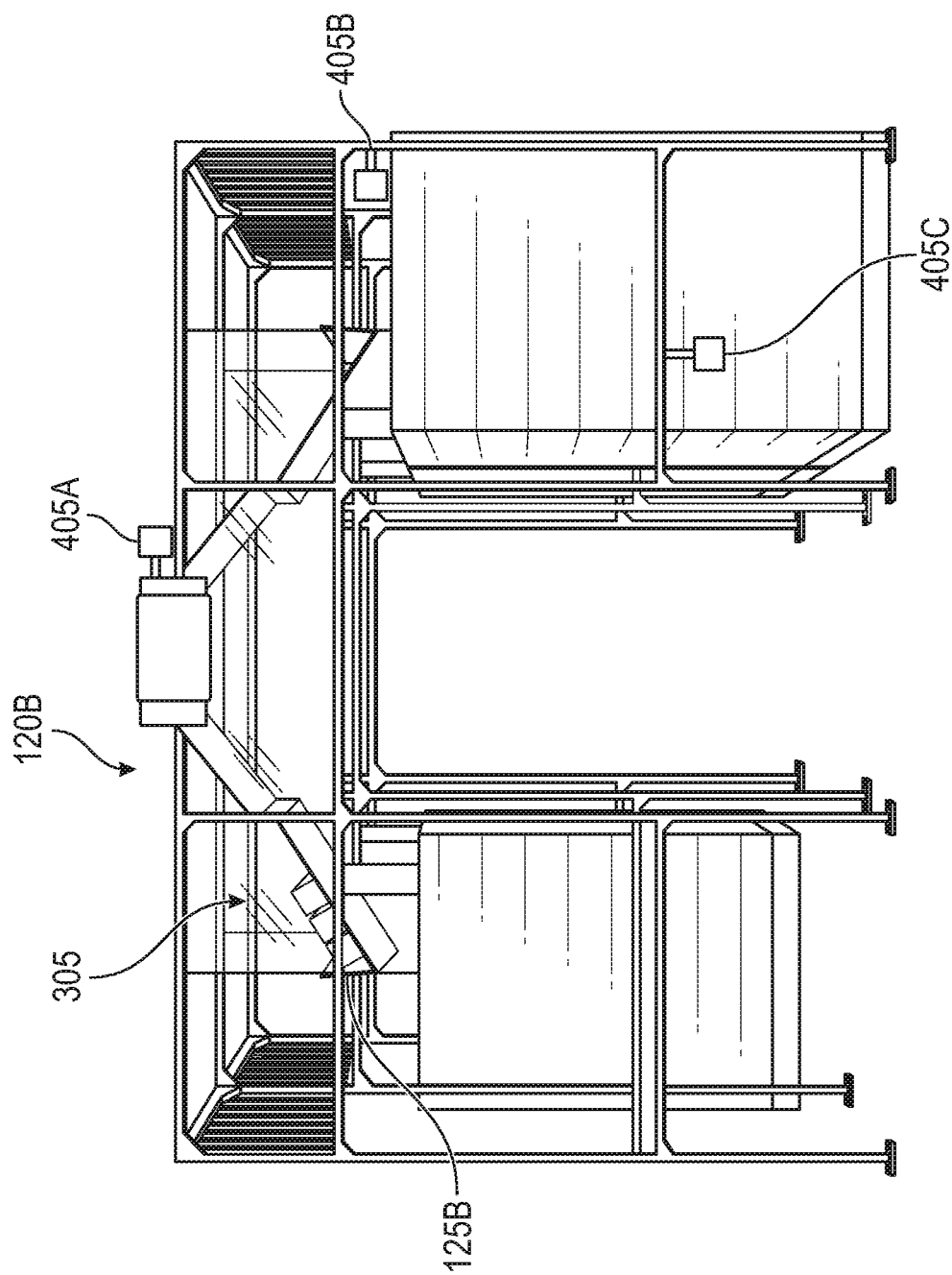

FIGS. 4A and 4B illustrate chutes with activated and deactivated flaps, according to one embodiment described herein. FIG. 4A is a top view of four chutes disposed along the sides of the conveyor belt 105 while FIG. 4B is a side view of the same system. In FIG. 4A, the chute 120A has a deactivated flap 125A where the flap is in a declined position to permit packages diverted from the belt 105 onto the chute 120A to slide off the flap 125A and into the container 130A. In contrast, the chute 120B has an activated flap 125B which has been rotated up into a vertical position, or at least, a more vertical position than the flap 125A, to block packages from sliding off the chute 120B. The activated flap 125B forms an accumulation area 305 where diverted packages can be stored on the chute 120B until a new container is disposed underneath the chute 120B.

As described in the method 200, the chute 120B accumulates or buffers the packages until a new container is disposed underneath the chute 120B. Then, the sorter controller can deactivate the flap 105B such that it moves to a similar position as the flap 125A. As a result, the buffered packages in the accumulation area 305 can slide down the flap 125B and into the new container. Put differently, deactivating the flap 105B means the flap 105B no longer blocks the packages from sliding off the chute 120B. Further, any additional packages that are diverted off the conveyor belt 105 slide off the chute 120B without being stored in the accumulation area 305.

FIG. 4B illustrates a side view of the flap 125B when activated to block packages diverted onto the chute 120B from the conveyor belt. As a result, packages are buffered or queued in the accumulation area 305.

Further, FIG. 4B illustrates various detectors that can be disposed at different locations in the sorting system to provide input to the sorter controller. The sorter controller can use this information to perform different blocks within the method 200. For example, the detector 405A is disposed near an interface between the conveyor belt and the top of a chute. In one embodiment, the detector 405A determines when a package is diverted from the sorter (e.g., by a diverter) into the chute. For example, the detector 405A may include a photo eye where the beam of the photo eye is interrupted as a package passes therethrough. The sorter controller can use this information to update the location of the package to either the container ID of the container underneath the chute or the accumulation area if there is currently no container underneath the chute and the flap has been activated to buffer the packages on the chute.

The detector 405B is disposed at a top of a container to detect when a container is full. As packages are ejected off the chute and into the container, these packages may be temporarily detected by the detector 405B. For example, the detector 405B may include a photo eye where falling packages temporarily interrupt its beam. However, if the container is full, the beam of the photo eye is blocked continuously. If the beam is blocked for longer than a predefined period of time (e.g., more than a second), that the container is full and the sorter controller output instructions to replace the container with a new container.

The detector 405C is disposed at a side of the container (i.e., the left side in FIG. 4B) that is opposite a side in which the container is pulled out when being replaced (i.e., the right side). That way, when an associate or robotic mover begins to remove the container, before the container is no longer under the chute (and thus, unable to catch package diverted onto the chute), the detector 405C informs the sorter controller that the container is being removed, and in response, the controller can activate the flap to begin buffering the packages. For example, the detector 405C can be a photo eye or presence detector which detects when the container is being moved to the right and away from the chute.

However, in another embodiment, the detector 405C may not be used to activate the flap. Instead, the sorter controller may activate the flap when issuing the instruction for the container to be replaced, or when an associate presses a button signifying her intention to remove the container. The detector 405C can nonetheless be used to automatically determine (without associate input) when a new container has been placed underneath the chute. In response, the sorter controller can use this information to deactivate the flap so that queued packages can be moved into the container.

Figure 5:
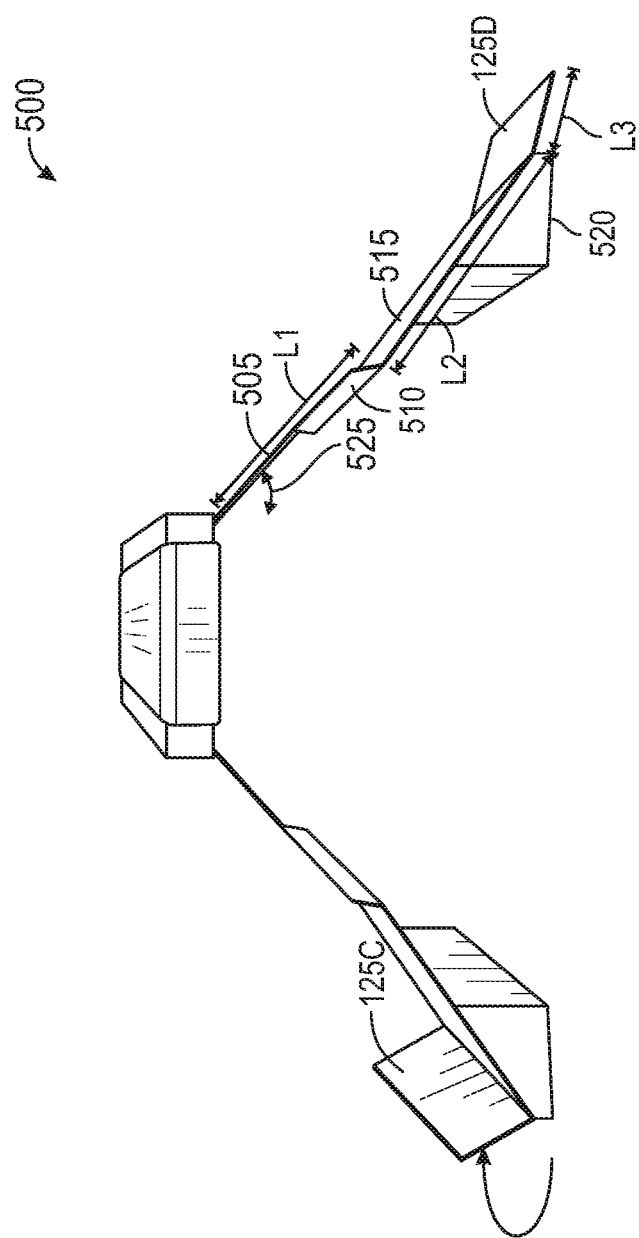
FIG. 5 is a side view of a step chute, according to one embodiment described herein.

FIG. 5 is a side view of a step chute 500, according to one embodiment described herein. The step chute 500 can be used as any of the chutes described above. The step chute 500 includes a first portion 505 connected to a second portion 515 by a step 510 (or vertical drop). The first portion 505 and the second portion 515 can have a same decline angle 525. This angle 525 can be set to any angle which ensures that packages diverted from the conveyor belt onto the chute slides down the first and second portions 505, 515. In one embodiment, the angle 525 may range from 20-40 degrees, and in one embodiment, from 25-35 degrees. In another embodiment, the decline angles 525 of the first and second portions 505, 515 are different. The specific values of the angle 525 may vary on the type of packages sliding along the portions 505, 515. For example, packages made from material that generates less friction with the material of the first and second portions 505, 515 (e.g., a smooth metallic material) may mean the chute 500 can have a less steep angle 525.

Unlike the first and second portions 505, 515 which are declined, the step 510 has a vertical (or near vertical) orientation relative to a ground surface (e.g., the floor of the warehouse). In one embodiment, the step 510 permits packages diverted when the flap 125D is in an activated position (as shown by the flap 125C) can be stacked on top of each other. That is, by including the step 510, the accumulation area formed when the flap 125D is rotate up may be able to store more packages than if the first and second portions 505, 515 were connected to form one continuous surface (i.e., the step 510 was removed from the chute 500). For example, as the first diverted package enters the chute 500, it slides over the step 510 and comes to rest on the second portion 515 (since further progress is blocked by the flap 125D). The next package also slides over the step 510, but since the step 510 lowers the second portion 515 relative to the first portion 505, the likelihood that the second package will stack on top of the first package is increased. Of course, this depends on the size of the step 510 and the size (thickness and length) and shape of the packages. For example, padded envelopes or thin mailers may be more likely to stack on each other in the second portion 515 than large cardboard boxes. In contrast, in a chute without the step 510, the packages are more likely to form a chain where the first package contacts the flap 125D at one end, a second package contacts an opposite end of the first package, a third package contacts an opposite end of the second package, and so forth. Because the packages do not stack, the amount of packages that can be stored in the accumulation area may be reduced.

In one embodiment, the first portion 505 has a length (L1) between 24-48 inches, the step 510 has a length (L2) between 3-6 inches, and the second portion 515 has a length (L3) between 24-48 inches. In one embodiment, the first and second portions 505 have lengths of around 36 inches+/−5 inches. In one embodiment, the flaps 125 have lengths (L3) of 12-24 inches. In one embodiment, the flaps 125 have lengths of 18 inches+/−4 inches.

The chute 500 also includes an actuator 520 for rotating the flap 125D. The actuator can be a pneumatic or electrical actuator for rotating the flap 125D from a deactivated state (e.g., the declined position) to an active state (e.g., a more vertical position). In one embodiment, the actuator 520 is a motorized driver roller (MDR). One advantage of using a MDR rather than other types of electrical and pneumatic actuators is that the MDR is easily replaceable (e.g., modular) if the MDR fails. Also, the MDR does not require an air supply as with pneumatic actuators.

FIG. 6 is a flowchart of a method 600 for monitoring a chute when temporarily buffering packages, according to one embodiment described herein. In one embodiment, the method 600 may be used to prevent too many packages from being buffered in the accumulation area of a chute when waiting for a new container to be added. That is, when a flap is active and diverted packages are being buffered in the chute, the method 600 can monitor the number of packages in the chute to make sure the chute does not fill such that diverted packages cannot be moved off the conveyor belt.

At block 605, the sorter controller activates (e.g. actuates) a flap on the chute to form an accumulation area. As discussed above, the flap may be rotated, raise, pivoted, or lowered to retain the packages in the chute. For example, block 605 may be performed in response to detecting that a container disposed under the chute has been (or will shortly be) removed.

At block 610, the sorter controller determines whether the new container has been added. This check could be done using a detector (e.g., the detector 405C in FIG. 4B) or by an associate pressing a button to indicate a new container has been disposed underneath the chute. If there is a new container, the method 600 proceeds to block 615 where the sorter controller deactivates the flap (e.g., actuates the flap). Doing so enables buffered packages (if any) to slide off the chute and into the new package.

However, if there is not yet a new container, the method 600 proceeds to block 620 where the sorter controller determines whether the accumulation area is full. In one embodiment, the sorter controller can use a detector positioned near the top of the chute (e.g., the detector 405A in FIG. 4B) to determine when the accumulation area is full and the chute cannot buffer any more packages. In one embodiment, the detector 405A is dual-purposed where one purpose is to detect packages entering the chute so the location of those packages can be updated, and another purpose is to determine when the accumulation area is full. For example, if the detector 405A is a photo eye where its beam remains interrupted, this indicates that the packages have stacked up in the accumulation area to almost reach the sorter. Put differently, the accumulation area may be full and cannot accommodate any more diverted packages.

If the accumulation area is not full, the method 600 proceeds to block 625 where the sorter controller permits additional packages to be diverted into the accumulation area in the chute. The method 600 can then return to block 610 and repeat as discussed above.

If, however, the accumulation area is full, the method 600 instead proceeds to block 630 where the sorter controller recirculates packages destined for the chute. Recirculating the packages may include keeping the packages on the conveyor belt (assuming the belt is a closed loop) or moving the packages off the conveyor belt into a temporary or catch-all container. The packages can be reloaded onto the sorter at a later time. By monitoring the status of the accumulation area, the sorter controller can prevent too many packages being diverted into the chute which can cause packages to jam or clog the conveyor belt or the diverters used to move the packages off the conveyor belt and into the chute and prevent other packages from being sorted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A chute, comprising:
   a first portion arranged at a decline relative to a ground surface;
   a second portion arranged at a decline relative to the ground surface; and
   a vertical step, wherein the second portion is connected to the first portion by the vertical step, wherein the vertical step establishes a vertical drop between the first and second portions of at least three inches;
   a moveable blocking surface; and
   a controller configured to move the blocking surface from a first position where objects traveling down the first portion can pass by the blocking surface and are ejected by the chute, to a second position where objects traveling down the first portion are blocked by the blocking surface and prevented from being ejected from the chute.

2. The chute of claim 1, wherein, when at the second position, the blocking surface is configured to hold the objects on the first portion, wherein the chute further comprises:
   opposing sides configured to establish an accumulation area along with the blocking surface and the first portion for holding the objects.

3. The chute of claim 1, wherein the blocking surface is rotatably connected to the first portion using a hinge, wherein the controller rotates the blocking surface relative to the first portion between the first and second positions.

4. The chute of claim 3, wherein, when in the first position, the blocking surface is declined relative to the ground surface such that the objects slide over the blocking surface when being ejected by the chute.

5. The chute of claim 1, wherein the blocking surface is arranged vertically, relative to the ground surface, when in the first and second positions, wherein moving the blocking surface between the first and second positions comprises one of raising and lowering the blocking surface in a direction normal to the ground surface.

6. The chute of claim 1, wherein the second portion, the vertical step, and the first portion form a path on which the objects travel when being ejected from the chute.

7. The chute of claim 1, wherein the chute is configured to apply a first force to move the blocking surface from the first position to the second position, wherein, when in the second position, the blocking surface can support a second force applied by objects accumulated on the first portion, wherein the second force is greater than the first force.

8. A chute, comprising:
   a first portion arranged at a decline relative to a ground surface;
   a moveable blocking surface; and
   a controller configured to move the blocking surface from a first position where objects traveling down the first portion can pass by the blocking surface and are ejected by the chute, to a second position where objects traveling down the first portion are blocked by the blocking surface and prevented from being ejected from the chute,
   wherein the blocking surface is arranged vertically, relative to the ground surface, when in the first and second positions, wherein moving the blocking surface between the first and second positions comprises one of raising and lowering the blocking surface in a direction normal to the ground surface.

9. The chute of claim 8, further comprising:
   a second portion arranged at a decline relative to the ground surface; and
   a vertical step, wherein the second portion is connected to the first portion by the vertical step.

10. The chute of claim 9, wherein the second portion, the vertical step, and the first portion form a path on which the objects travel when being ejected from the chute.

11. The chute of claim 9, wherein the vertical step establishes a vertical drop between the first and second portions of at least three inches.

12. The chute of claim 8, wherein the chute is configured to apply a first force to move the blocking surface from the first position to the second position, wherein, when in the second position, the blocking surface can support a second force applied by objects accumulated on the first portion, wherein the second force is greater than the first force.

13. A chute, comprising:
   a first portion arranged at a decline relative to a ground surface;
   a second portion arranged at a decline relative to the ground surface; and
   a vertical step, wherein the second portion is connected to the first portion by the vertical step;
   a moveable blocking surface, wherein the second portion is between the first portion and the blocking surface; and
   a controller configured to move the blocking surface from a first position where objects traveling down the first portion can pass by the blocking surface and are ejected by the chute, to a second position where objects traveling down the second portion are blocked by the blocking surface and prevented from being ejected from the chute.

14. The chute of claim 13, wherein the vertical step establishes a vertical drop between the first and second portions of at least three inches.

15. The chute of claim 13, wherein the chute is configured to apply a first force to move the blocking surface from the first position to the second position, wherein, when in the second position, the blocking surface can support a second force applied by objects accumulated on the second portion, wherein the second force is greater than the first force.

16. The chute of claim 13, wherein the moveable blocking surface is at least one of: mounted by a hinge to the second portion, or is vertical surface that remains in a vertical position when moving between the first and second positions.

17. The chute of claim 13, wherein, when at the second position, the blocking surface is configured to hold the objects on the first portion, wherein the chute further comprises:
  opposing sides configured to establish an accumulation area along with the blocking surface and the second portion for holding the objects.

18. The chute of claim 13, wherein the blocking surface is rotatably connected to the second portion using a hinge, wherein the controller rotates the blocking surface relative to the second portion between the first and second positions.

\* \* \* \* \*